US011602695B2

(12) United States Patent
Elbert et al.

(10) Patent No.: US 11,602,695 B2
(45) Date of Patent: Mar. 14, 2023

(54) PLAYER-CONTROLLED ANONYMITY OF INTERACTIVE SCORING SESSIONS

(71) Applicant: Disney Enterprises, Inc., Burbank, CA (US)

(72) Inventors: Jeffrey L. Elbert, Los Angeles, CA (US); Brent D. Strong, Newhall, CA (US); Bob Hickman, Simi Valley, CA (US); Robert J. Peitzman, Torrance, CA (US)

(73) Assignee: Disney Enterprises, Inc., Burbank, CA (US)

( * ) Notice: Subject to any disclaimer, the term of this patent is extended or adjusted under 35 U.S.C. 154(b) by 30 days.

(21) Appl. No.: 17/239,788

(22) Filed: Apr. 26, 2021

(65) Prior Publication Data

US 2022/0339544 A1 Oct. 27, 2022

(51) Int. Cl.
*A63F 13/46* (2014.01)
*A63F 13/79* (2014.01)
*A63F 13/35* (2014.01)

(52) U.S. Cl.
CPC .............. *A63F 13/79* (2014.09); *A63F 13/35* (2014.09); *A63F 13/46* (2014.09)

(58) Field of Classification Search
None
See application file for complete search history.

(56) References Cited

U.S. PATENT DOCUMENTS

| 7,758,435 | B2 | 7/2010 | Henry et al. |
| 9,147,191 | B2 | 9/2015 | Cohen et al. |
| 9,223,885 | B2 | 12/2015 | Marsico |
| 10,603,564 | B2 | 3/2020 | Yeh et al. |
| 2004/0002384 | A1* | 1/2004 | Multerer ................. A63F 13/12 463/42 |
| 2004/0242332 | A1* | 12/2004 | Walker .................... A63F 13/79 463/42 |
| 2013/0032634 | A1* | 2/2013 | McKirdy ............. A61B 5/0205 235/375 |
| 2015/0011309 | A1 | 1/2015 | Eloff et al. |
| 2016/0203352 | A1 | 7/2016 | Marsico |
| 2019/0318539 | A1 | 10/2019 | Weston |

FOREIGN PATENT DOCUMENTS

KR     20130055794 A     5/2013

* cited by examiner

Primary Examiner — Damon J Pierce
(74) Attorney, Agent, or Firm — Patterson + Sheridan, LLP (57) ABSTRACT

A method includes storing a plurality of scores and a plurality of session identifiers for a game. The plurality of scores are generated by monitoring player activity during game sessions identified by the plurality of session identifiers and by applying rules of the game to determine scoring events based on the player activity. The method also includes generating, during a game session, a code for a player, providing the code to the player before the player leaves the game, and receiving, from a device, a target session identifier generated by the device based on the code and in response to receiving the target session identifier. The method further includes retrieving a score of the plurality of scores generated during a game session identified by a session identifier of the plurality of session identifiers that matches the target session identifier and communicating, to the device, the retrieved score.

21 Claims, 6 Drawing Sheets

PLAYER-CONTROLLED ANONYMITY OF INTERACTIVE SCORING SESSIONS

BACKGROUND

Many games (e.g., arcade games, laser tag games, amusement park rides, etc.) involve players performing actions or tasks to score points. The players may compete to see which player scores the most points during a game session. These games may present the players' scores publicly using one or more display screens at the end of the game as the players leave the game. Players may view the screen to determine their scores and to determine their performance relative to other players.

SUMMARY

According to an embodiment, a method includes storing, by a hardware processor of a score server and in a database, a plurality of scores and a plurality of session identifiers for a game. The plurality of scores are generated by monitoring player activity during game sessions identified by the plurality of session identifiers and by applying rules of the game to determine scoring events based on the player activity. The method also includes generating, by the hardware processor of the score server and during a game session, a code for a player, providing the code to the player before the player leaves the game, and receiving, by the hardware processor of the score server and from a device of the player, a target session identifier generated by the device of the player based on the code and in response to receiving the target session identifier. The method further includes retrieving, by the hardware processor of the score server and from the database, a score of the plurality of scores generated during a game session identified by a session identifier of the plurality of session identifiers that matches the target session identifier and communicating, to the device of the player, the retrieved score. Other embodiments include an apparatus for performing this method.

According to another embodiment, a method includes monitoring, by a hardware processor, activity of a player during a session of a game and generating, by the hardware processor, a score for the player by applying rules of the game to the activity to determine scoring events. The method also includes communicating, by the hardware processor, the score and a session identifier for the session to a server and displaying a quick response (QR) code to the player before the player leaves the game. The player scans the QR code to communicate, to the server, a target session identifier matching the session identifier and to receive, from the server, the score.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

In games and sporting events where performance metrics such as scores, lap speed, interval times, drive/hit distance and the like are presented on a public screen that is viewable by multiple players (e.g., arcade games, laser tag games, amusement park rides, etc.), the privacy of the players is put at risk. For example, a player's name may be posted on a publicly viewable leaderboard. Even where names are not posted, a person can monitor a player as the player reviews the scores to see which scores interest the player (e.g., by the player pointing at particular scores or taking pictures of particular scores). The person may then deduce which score is the player's and determine the identity of the player based on a name or handle presented on the screen next to the score.

Additionally, when the scores are presented on a shared screen, many players and observers tend to congregate around the screen for long periods of time to determine and discuss their scores. When the players congregate in this manner, it causes congestion that disrupts the movement of other players leaving the game and makes it more difficult for the players to social distance.

This disclosure contemplates a system that improves privacy and congestion. Generally, the system anonymously records performance information such as the scores of players across game sessions and stores the performance information in a database that is indexed by a session identifier. A "game session" refers to a particular instance of game play, sporting activity, or the like characterized by one or more players that occurs at a particular time or span of time, and may occur at a specific physical or virtual space. In other words, the system is aware of the performance information for a specific player, or specific group of players, in a specific game session, but is not aware of the identity or identifying information of the specific player or group of players. A game session is identified with a session identifier, which can take any form that identifies a particular game session with sufficient uniqueness to meet the needs of a particular application. Each player is provided a unique code (e.g., a quick response (QR) code, linear barcode, value stored on an RFID chip, verbal or audio code, alphanumeric code, or the like) that is linked to that player's or group of players' game session before the player leaves the game.

The player may use a personal device (e.g., a smartphone) to scan and decode the code at a time of the player's choosing. For example, the player may take a picture of the code and then scan the code later when convenient or appropriate for the player to do so. The code may include information that is used by the personal device to determine a target session identifier. The device communicates the target session identifier to a score server that retrieves, from the database, the performance information for a game session identified by a session identifier that matches the target session identifier. The score server then communicates the performance information to the player's personal device for viewing. Alternatively or in addition, the score server may communicate a list of top scores to the player's device, and the player may review the list of top scores using the personal device. Also alternatively or in addition, the player may designate de-anonymizing rules to be communicated along with the target session identifier. For example, the player may designate their name, nickname, team name, age, avatar, image, or other personal information that is then associated with the session identifier and stored in the database. The de-anonymizing rules may also specify the manner in which personal information is used. For example, the player's name may be visible only to other team members, or members of a school or religious group, or only with other players of a specified age. The de-anonymizing rules may also specify a time frame (e.g., the personal information can be used only today) or geographic restrictions (e.g., the personal information can be used at a specific location, but not affiliated locations). In this manner, the players may view performance information in private and have complete control over whether and how to opt-in with additional information to de-anonymize the performance information. Moreover, the players need not stop to view a shared screen to see their performance information, which reduces congestion and improves social distancing.

Figure 1A:
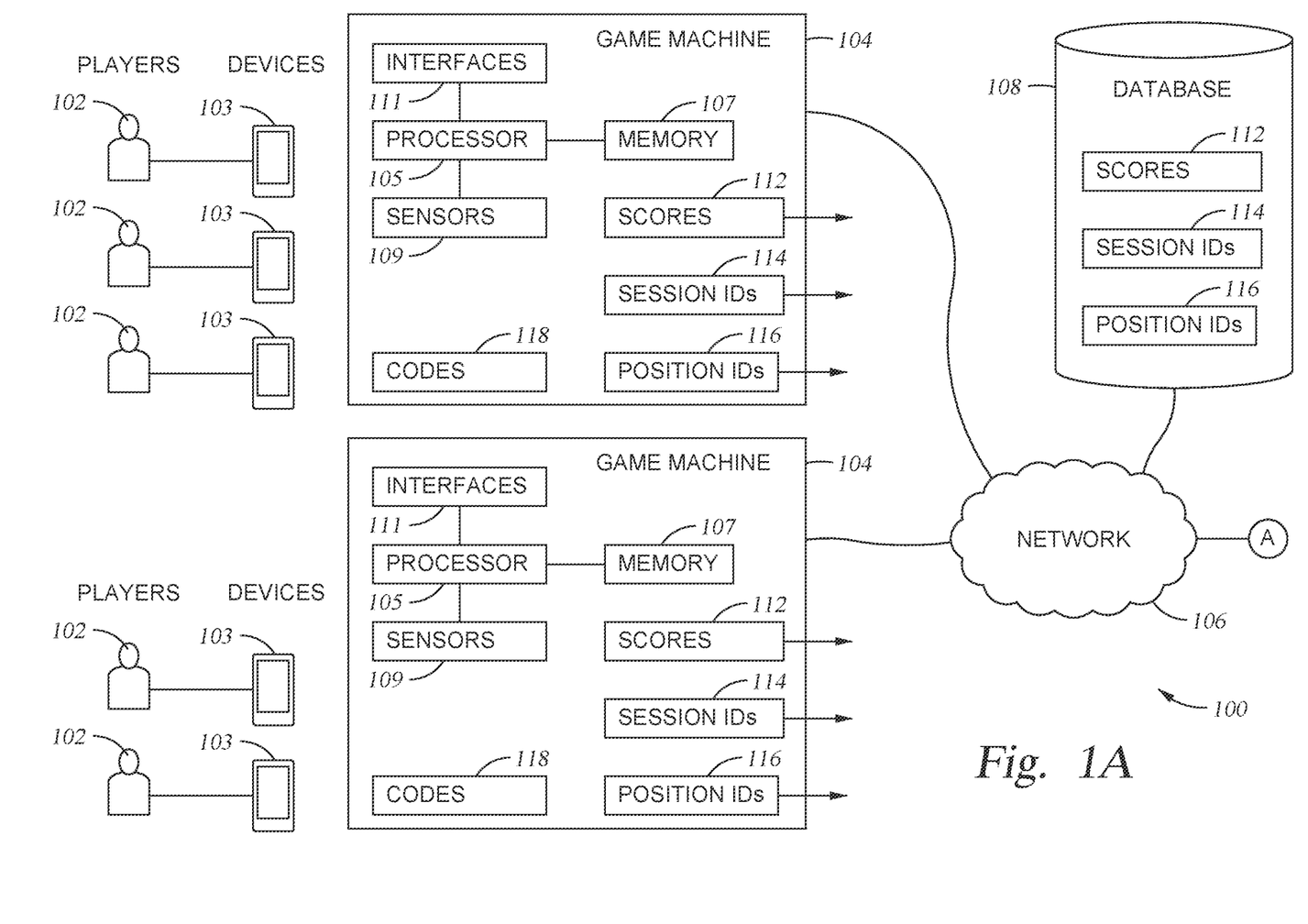
FIGS. 1A and 1B illustrate an example system.
Figure 1B:
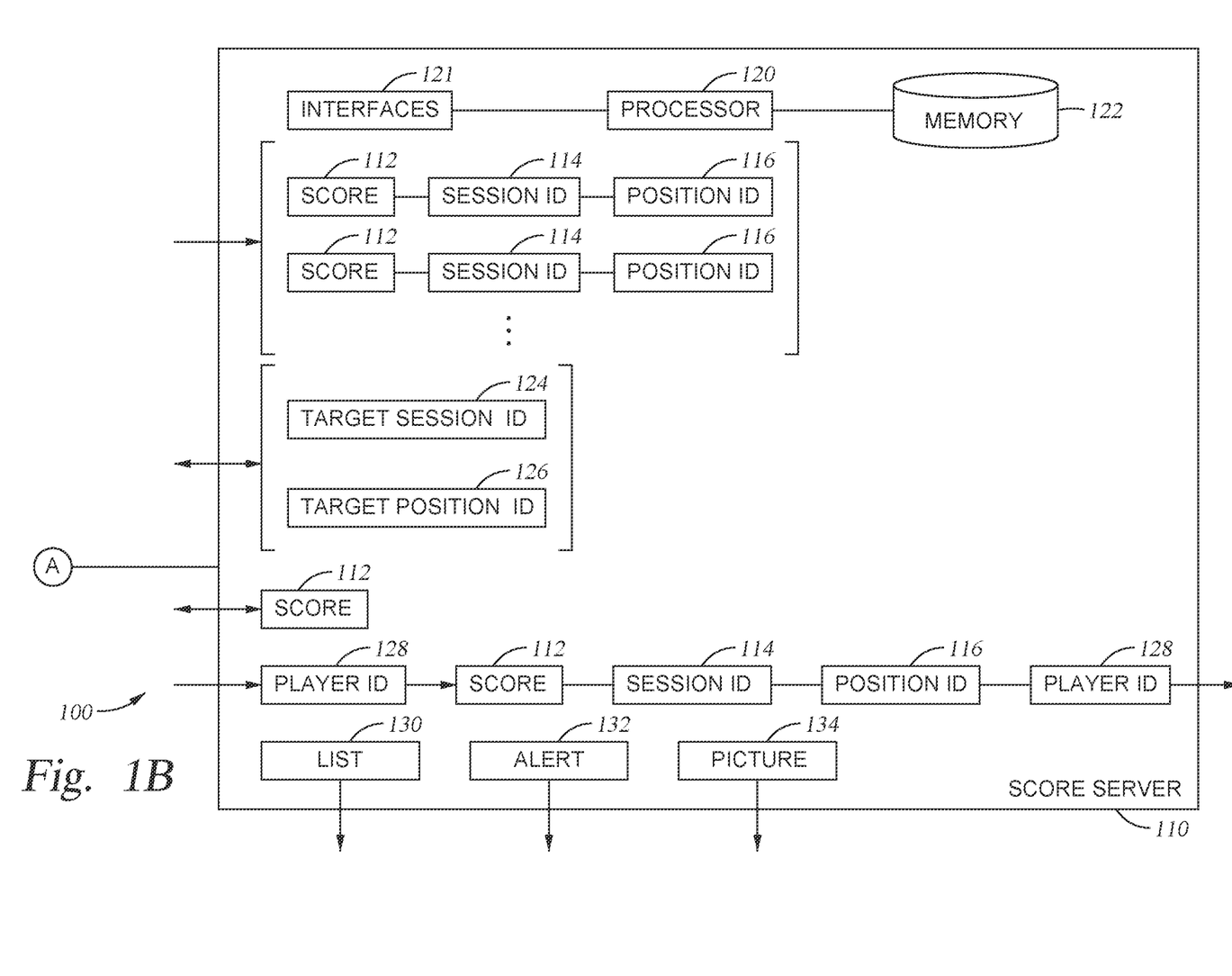

To ease understanding, features of the disclosure are described in terms of a system for attraction-based game play where player scores are the only performance data used. However, the exemplary embodiments are readily adapted to a variety of game and sporting events and to various types of performance data handled during those events. FIGS. 1A and 1B illustrate an example system 100. As seen in FIGS. 1A and 1B, the system 100 includes one or more devices 103, one or more game machines 104, a network 106, a database 108, and a score server 110 (shown in FIG. 1B). Generally, one or more players 102 play a game using the game machines 104 and their scores or other performance data during the game sessions are stored in the database 108 anonymously. The players 102 are provided codes before the players 102 leave the game. The players 102 then use their personal devices 103 to scan and decode their codes in private, which produces a link to the players' 102 session and scores. The score server 110 uses the link to retrieve the players' 102 scores and communicates the scores to the devices 103. In this manner, the system 100 improves the privacy of the players 102, reduces congestion, and improves social distancing in particular embodiments.

A device 103 is any suitable device having a network interface and protocol software capable of communicating with components of the system 100 over the network 106. As an example, the device 103 may be a computer, a laptop, a wireless or cellular telephone, an electronic notebook, a personal digital assistant, a tablet, or any other device capable of receiving, processing, storing, or communicating information with other components of the system 100. The device 103 may be a wearable device such as a virtual reality or augmented reality headset, a smart watch, or smart glasses. The device 103 may also include an interface, such as a display, a microphone, keypad, or other appropriate terminal equipment usable by the player 102. The device 103 may include a hardware processor, memory, or circuitry that is configured to execute software, implement communications protocols, and receive and display information with player 102 to perform any of the functions or actions of the device 103 described herein. For example, software may be stored in the memory and executed by the processor to perform the functions of the device 103. As will be described in more detail below, the player 102 may use the device 103 to (1) scan or decode a code provided by a game machine 104 to determine a session identifier and/or position identifier of the player 102, (2) communicate the session identifier and/or position identifier to the score server 110 to receive the player's 102 score from the score server 110, (3) de-anonymize and/or re-anonymize the score received from the score server 110, and (4) view a list of top scores received from the score server 110.

The game machines 104 include hardware and software that implement instances of a game that one or more players 102 play. The game machines 104 may implement any number of instances of the game. As seen in FIG. 1A, the game machines 104 include processors 105 and memories 107 that are configured to perform the functions or actions of the game machines 104 described herein. The game machines 104 also include one or more sensors 109 and one or more interfaces 111. Game machines 104 may be stand-alone systems, but in particular embodiments are integrated with other systems for implementing and controlling a ride, show or attraction in which the game is played. These other systems include vehicle movement control, safety systems, lighting and special effects systems and the like that are supervised by one or more show control systems that execute a show script for coordinating behavior of the many component systems.

A processor 105 may execute software instructions stored in a memory 107 to implement the game (e.g., administer game mechanisms such as special effects and timers, monitor sensors 109 to determine when scoring events occur, apply game rules to determine a number of points to award for each scoring event, maintain scores 112 that represent the total number of points that players 102 have been awarded during the game sessions, and assign session identifiers 114 and/or position identifiers 116 that identify game sessions and the positions of players 102 respectively). The processor 105 is any electronic circuitry, including, but not limited to microprocessors, application specific integrated circuits (ASIC), application specific instruction set processor (ASIP), and/or state machines, that communicatively couples to the memory 210 and controls the operation of the game machine 104. The processor 208 executes software stored on the memory 210 to perform any of the programmatic functions of the game machine 104 described herein. The processor 208 controls the operation and administration of the game machine 104 by processing information (e.g., information received from the devices 103 and the memory 210).

The memory 107 stores, either permanently or temporarily, data, operational software, or other information for the processor 105. The memory 107 may include any one or a combination of volatile or non-volatile local or remote devices suitable for storing information. For example, the memory 107 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 107, a disk, a CD, or a flash drive. In particular embodiments, the software may include code and instructions executable by the processor 105 to perform one or more of the functions of the game machine 104 described herein.

The sensors 109 include hardware and/or software that detect when certain events occur in a game. For example, the sensors 109 may include bumpers and targets in a pinball game that detect when a ball hits the bumpers and targets. As another example, the sensors 109 may include light sensors in a laser tag game that detect when a laser is directed at the light sensor. The game machine 104 (e.g., the processor 105) monitors the sensors 109 to determine when a scoring event occurs during a game. The game machine 104 applies the rules of the game to determine a number of points to award to a player 102 who caused the scoring event. The game machine 104 then increments a score 112 of the player 102 by the determined number of points.

The game machines 104 interact with the players 102 or the other components of the system 100 (e.g., the database 108 and the score server 110) through the interfaces 111. For example, the interfaces 111 may include human interfaces (e.g., buttons, switches, levers, etc.) that can be operated by the players 102 to perform certain actions or to cause certain events to occur during a game. When a player 102 presses a button during a pinball game, the game machine 104 may actuate flippers to hit a ball. When a player 102 presses switches or pushes/pulls levers during a laser tag game, the game machine 104 may activate a handheld laser or open a door in the laser tag arena. As another example, the interfaces 111 may include communication interfaces (e.g., ports, antennas, radios, etc.) through which the game machines 104 communicate with the devices 103, the database 108, and the score server 110 (e.g., over the network 106). The game machines 104 may communicate information (e.g., the scores 112, session identifiers 114, or position identifiers 116) to the devices 103, the database 108, or the score server 110 through the interfaces 111 by formatting the information according to a communication protocol implemented by the network 106 and then transmitting the formatted information through these interfaces 111. The game machines 104 may also receive information (e.g., the scores 112, session identifiers 114, or position identifiers 116) from the devices 103, the database 108, or the score server 110 through the interfaces 111.

In the example of FIGS. 1A and 1B, the system 100 includes two separate game machines 104. The separate game machines 104 may be located in different geographic locations. Any number of players 102 may play the game implemented by the game machines 104 simultaneously. For example, one player 102 may play the game in a game machine 104 by themself. As another example, multiple players 102 may play the game in a game machine 104 at the same time. In the example of FIGS. 1A and 1B, three players 102 are playing at a game machine 104 in a first geographic location, and two players 102 are playing at a second game machine 104 at a second geographic location.

As one or more players 102 play a game, the players 102 may score points or make other performance achievements. The game machines 104 include one or more sensors 109 that detect scoring events during the course of a game. For example, if the game machine 104 is a pinball machine in an arcade, then the pinball machine includes bumpers and targets that detect when a ball hits them. The players 102 score points when the ball hits these bumpers and targets. As another example, if the game machine 104 implements a laser tag game, then the game machine 104 includes light sensors that are dispersed throughout an arena or disposed within suits worn by the players 102. The players 102 score points when they hit these light sensors with a handheld laser.

The game machine 104 monitors the sensors 109 to determine when scoring events occur. When a scoring event is detected, the game machine 104 applies game rules to determine a number of points to be awarded to a player 102 who caused the scoring event. For example, a pinball machine may determine that different amounts of points should be awarded to a player 102 depending on the different bumpers or targets that the ball hits. As another example, a game machine 104 implementing a laser tag game, may determine that different amounts of points should be awarded to a player 102 depending on the different light sensors that the player 102 hits with a handheld laser. The game machine 104 then increments a score 112 for the player by the determined number of points. The score 112 represents the total number of points that the player 102 has accumulated during a game session.

The game machine 104 also associates a session identifier 114 with a particular instance of game play which may involve one or more still anonymous players 102 at a particular time or time period and occurs at a particular physical or virtual space. The session identifier 114 is linked with the scores 112 of the one or more anonymous players 102. For example, the game machine 104 may store the scores 112 in a data structure (e.g., a table) in the database 108 using the session identifier 114 as an index. In certain embodiments, the game machine 104 also tracks position identifiers 116 that identify physical or virtual positions of the players 102 when playing the game. For example, if the players 102 are seated in a certain order when playing the game (e.g., during a trivia game), then the position identifier 116 identifies the physical seating position, in this case relative order, of each player 102 during the game session. As another example, if the players 102 wear suits when playing the game (e.g., during a laser tag game), then the position identifier 116 identifies the suit each player 102 wore during the game session. More generally, any game information or data that is relevant to a particular game may be stored within a data structure in database 112 and indexed by the session identifier 114. The game machine 104 links the position identifiers 116 to their respective scores 112 and session identifiers 114. For example, the game machine 104 may store the scores 112 in a data structure in the database 108 using a session identifier 114 and a position identifier 116 as indexes. In some embodiments, the game machine 104 combines the session identifier 114 and the position identifier 116 to form a single index used to retrieve a corresponding score 112 from a data structure in the database 108.

The scores 112, session identifiers 114, and position identifiers 116 are stored in the database 108. The game machine 104 may communicate the scores 112, session identifiers 114, and position identifiers 116 directly to the database 108 (e.g., through the network 106), and/or the game machine 104 may communicate the scores 112, session identifiers 114, and position identifiers 116 to the score server 110 shown in FIG. 1B (e.g., through the network 106). The score server 110 then stores the scores 112, session identifiers 114, and position identifiers 116 into the database 108. To communicate the scores 112, the session identifiers 114, and the position identifiers 116, the game machine 104 may format the scores 112, session identifiers 114, and position identifiers 116 according to a communication protocol implemented by the network 106. The game machine 104 then transmits the formatted scores 112, session identifiers 114, and position identifiers 116 over the network 106 to the database 108 or the score server 110. Each of the scores 112 may be retrieved from the database 108 by providing a corresponding session identifier 114 and position identifier 116.

The game machine 104 generates codes 118 for the one or more players 102 during a game session. Each code 118 includes information that can be used to determine a session identifier 114 and/or position identifier 116 of a player 102. The code may not reveal the session identifier 114 and position identifier 116. Instead, the code 118 may be an image or text that encodes the session identifier 114 and, if used, the position identifier 116. For example, the code 118 may be a linear barcode that encodes the session identifier 114 and/or the position identifier 116 using the arrangement of the bars of the linear barcode. As another example, the code 118 may be a QR code that encodes the session identifier 114 and/or the position identifier 116 using the arrangement of squares within a two-dimensional grid. As yet another example, the code 118 may be a universal resource locater (URL) or a text string that includes the session identifier 114 and/or the position identifier 116. In some embodiments, the code 118 also encodes the player's 102 score 112 in addition to the session identifier 114 and/or the position identifier 116. In these embodiments, the device 103 can determine a player's 102 score from the code 118 itself. Additionally, as will be discussed later, the device 103 can transmit the score 112 along with the session identifier 114 and/or the position identifier 116 to the score server 110 for validation purposes.

The game machine 104 provides a code 118 to a player 102 using any suitable mechanism. For example, the game machine 104 may display the code 118 to the player 102 on a display located near the player 102 when the player 102 is playing the game. As another example, a printer near the player 102 when the player 102 is playing the game may print the code 118 on a piece of paper for the player 102. In this manner, the player 102 is provided the code 118 before the player 102 leaves the game and while the player 102 remains anonymous to the game machine 104.

The player 102 may then use a personal device 103 to scan and decode the code 118 to determine the session identifier 114 and/or the position identifier 116 encoded by the code 118. The personal device 103 then communicates the session identifier 114 and the position identifier 116 for that player 102 to the score server 110 through the network 106. The device 103 may format the session identifier 114 and/or the position identifier 116 according to any communication protocol supported by the network 106 (e.g., cellular protocols, wireless fidelity (WiFi) protocols, etc.). The device 103 then transmits the formatted session identifier 114 and/or the position identifier 116 to the network 106, which completes the routing to the score server 110. The score server 110 then uses the session identifier 114 and/or the position identifier 116 to index into the database 108. The database 108 locates the score 112 that is indexed with the session identifier 114 and/or the position identifier 116 and returns the score 112 to the score server 110. The score server 110 then responds to the device 103 with the score 112 returned by the database 108.

The player 102 may also use the device 103 to de-anonymize or re-anonymize the score 112. For example, the player 102 may provide identifying information that the score server 110 then links to the score 112 (e.g., by storing the identifying information with the score 112 in the database 108). This identifying information may be displayed to other players 102 who view the score 112 (e.g., on a high scores list). The player 102 may then use the device 103 to de-anonymize the score 112. For example, the player 102 may select on the device 103 an option to unlink the identifying information from the score 112. The score server 110 then unlinks the score 112 from the identifying information (e.g., by removing the identifying information from the database 108) so that the identifying information is not displayed to other players 102 when the other players 102 view the score 112 (e.g., on a high scores list).

Some game machines 104 do not use position identifiers 116. For example, for games in which only a single player 102 plays during a session, there is no need to generate or use a position identifier 116. Or when the game mechanics and logic only require a team or group of players to be identified, the session identifier 114 is sufficient to identify the team or group. As another example, certain game machines 104 may assign different session identifiers 114 to different players 102 during a multiplayer game that the players 102 are playing simultaneously or together. In other words, even though the players 102 are playing in the same game session, the game machines 104 nevertheless assign different session identifiers 114 to the players 102. In this manner, the different session identifiers 114 still identify the game session, but they are also sufficient to identify the individual scores of the players 102 during the game session. When the session identifier 114 is sufficiently granular to associate with the player 102 or players 102 required by the particular game, the code 118 provided to the player 102 or players 102 is linked to the session identifier 114 but not a position identifier 116.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In some embodiments, the system 100 does not include the network 106 between the game machines 104, the database 108, and the score server 110 (although the devices 103 may still use a network (e.g., a WiFi network or a cellular network) to communicate with the score server 110). In these embodiments, the game machines 104, the database 108, and the score server 110 are implemented in the same computing device or across multiple computing devices in a common location or in a distributed fashion. In other words, a single computing device or a group of computing devices directly connected to each other may be configured to perform the functions of the game machines 104, the database 108, or the score server 110.

The score server 110, shown in FIG. 1B, processes the scores 112 from the game machines 104. The score server 110 may be a computing device separate from the game machines 104. The computing device may include hardware (e.g., a processor 120, interfaces 121, and a memory 122) and software that, when executed by the hardware, causes the computer to perform the functions or the actions of the score server 110 described herein. For example, when the processor 120 executes the software, the processor 120 may store the scores 112 from a game machine 104 into the database 108 by transmitting the scores 112 through the interfaces 121 to the database 108. As another example, the processor 120 may transmit, through the interfaces 121 and to the database 108, a session identifier 114 and a position identifier 116 received from a device 103 to retrieve, from the database 108, a score 112 indexed by the session identifier 114 and the position identifier 116. As yet another example, the processor 120 may transmit, through the interfaces 121 and to a device 103, a score 112 retrieved from the database 108.

In some embodiments, the score server 110 and the game machine(s) 104 are not separate computing devices. Rather, the score server 110 and the game machine(s) 104 are embodied within the same computing device or multiple computing devices in a common location or in a distributed fashion. In these embodiments, the computing device or the multiple computing devices are configured to perform the functions of the game machine(s) 104 and the score server 110.

The processor 120 is any electronic circuitry, including, but not limited to microprocessors, application specific integrated circuits (ASIC), application specific instruction set processor (ASIP), and/or state machines, that communicatively couples to memory 122 and controls the operation of the score server 110. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on memory to perform any of the functions described herein. The processor 120 controls the operation and administration of the score server 110 by processing information (e.g., information received from the game machines 104, network 106, database 108, and memory 122). The processor 120 may be a programmable logic device, a microcontroller, a microprocessor, any suitable processing device, or any suitable combination of the preceding. The processor 120 is not limited to a single processing device and may encompass multiple processing devices.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In particular embodiments, the software may include an application executable by the processor 120 to perform one or more of the functions described herein.

The score server 110 may receive scores 112, session identifiers 114, and position identifiers 116 from the game machines 104. Each score 112 may be linked to a session identifier 114 and, optionally, a position identifier 116. The score server 110 stores the scores 112, session identifiers 114, and position identifiers 116 into the database 108. For example, the scores 112 may be stored in data structures in the database 108 that use the session identifiers 114 and the position identifiers 116 as indexes. Each score 112 may be subsequently retrieved from the database 108 using the session identifier 114 and, if necessary, the position identifier 116.

When a player 102 scans a code 118 using the player's 102 personal device 103, the personal device 103 decodes the code 118 to determine a target session identifier 124 and, if used, a target position identifier 126. For example, the code 118 may be a quick response (QR) code that the player's 102 personal device 103 can scan and decode to determine the target session identifier 124 and, if used, the target position identifier 126 encoded in the QR code. The device 103 may then communicate the target session identifier 124 and, if used, the target position identifier 126 to the score server 110. As another example, the code 118 may be a URL that points to or a text string that contains the target session identifier 124 and, if used, the target position identifier 126. The device 103 may communicate the target session identifier 124 and, if used, the target position identifier 126 to the score server 110 when navigating to a webpage identified by the URL. Alternatively, the device 103 may extract the target session identifier 124 and, if used, the target position identifier 126 from the text string and communicate the target session identifier 124 and, if used, the target position identifier 126 to the score server 110. In some embodiments, the code 118 also includes the player's 102 score 112 from the game session. The device 103 communicates, to the score server 110, the score 112 with the target session identifier 120 and the target position identifier 122 for validation purposes.

The device 103 communicates the target session identifier 124 and the target position identifier 126 to the score server 110. The score server 110 then communicates the target session identifier 124 and the target position identifier 126 to the database 108 to retrieve a score 112 indexed in the database 108 by the target session identifier 124 and the target position identifier 126. For example, the score server 110 may communicate to the database 108 a request that includes the target session identifier 124 and the target position identifier 126. The database 108 may then return the score 112 indexed by a session identifier 114 and a position identifier 116 that match the target session identifier 124 and the target position identifier 126. In other words, the target session identifier 124 and the target position identifier 126 uniquely identify the score 112 earned by the player 102 when playing the game. The score server 110 communicates this score 112 to the device 103 so that the player 102 may view the score 112 on the device 103 (e.g., on a webpage or through an application). In this manner, the score server 110 protects the privacy of the player 102 when viewing the score 112. Additionally, the score server 110 allows the player 102 to view the score 112 without crowding with other players around a central or public display screen which reduces congestion and improves social distancing in particular embodiments.

In some embodiments, the device 103 determines and communicates, to the score server 110, the score 112 along with the target session identifier 124 and the target position identifier 126. For example, the code 118 may be a barcode or a QR code that encodes the score 112 along with the target session identifier 124 and the target position identifier 126. When the device 103 decodes the barcode or the QR code, the device 103 determines the score 112 along with the target session identifier 124 and the target position identifier 126. As another example, the code 118 may be a URL or text string that includes the target session identifier 120, the target position identifier 122, and the score 112. The device 103 extracts the score 112 from the URL or text string along with the target session identifier 124 and the target position identifier 126. As yet another example, the player 102 may remember score 112 from the game session and input the score 112 on the device 103. The score server 110 communicates to the database 108 a request that includes the target session identifier 124 and the target position identifier 126. The database 108 returns the score 112 indexed by a session identifier 114 and a position identifier 116 that match the target session identifier 124 and the target position identifier 126. The score server 110 then compares the score 112 provided by the device 103 with the score 112 received from the database 108 to validate the target session identifier 124 and the target position identifier 126. In this manner, the score server 110 provides some security against a player 102 guessing or spoofing codes 118, the target session identifier 124, or the target position identifier 126.

In some embodiments, the player 102 may choose to provide, based on their own privacy preferences, through the device 103, one or more player identifier(s) 128. For example, the player identifier 128 may be a name of the player 102 or a handle of the player 102. As another example, the player identifier 128 may be a picture of the player 102 or an avatar image. The score server 110 receives the player identifier 128 and links the player identifier 128 to the score 112, the session identifier 114, and the position identifier 116. The score server 110 communicates the player identifier 128 to the database 108, and the database 108 stores the player identifier 128 using the session identifier 114 and the position identifier 116 as indexes. For example, the database 108 may store the player identifier 128 in the same data structure as its associated score 112 so that when the session identifier 114 and the position identifier 116 are presented to the database 108, the database 108 retrieves both the score 112 and the player identifier 128. Alternatively or additionally, the database 108 may store the player identifier 128 in a separate data structure indexed by the session identifier 114 and the position identifier 116. When the database 108 is presented with the session identifier 114 and the position identifier 116, the database 108 retrieves the score 112 and the player identifier 128 from their separate data structures. In this manner, the player 102 is enabled to choose based on their own preferences whether to personalize or de-anonymize the score 112 by linking the player identifier 128 to the score 112. As a result, the player 102 is given control over the privacy of the player identifier 128. In certain embodiments, the player 102 has the option to re-anonymize the score 112. For example, after the player identifier 128 is linked to the score 112, the player 102 may no longer wish for the player identifier 128 to be displayed publicly. The player 102 may communicate a request to the score server 110 using the device 103 to unlink the player identifier 128 from the score 112. In response, the score server 110 unlinks the player identifier 128 from the score 112 so that the player identifier 128 is not displayed publicly with the score 112.

The score server 110 may generate a list 130 of high scores 112 earned when playing the game. For example, the list 130 may include the top scores 112 earned by players 102 when playing the game. The score server 110 may reset the list 130 according to any desired frequency. For example, the score server 110 may reset the list 130 daily. The list 130 may include the top scores 112 earned across every instance of the game. Additionally, the list 130 may be segmented based on the different instances of the game across different geographic locations, age groups, experience levels or other demographic distinctions. For example, the list 130 may rank the top scores 112 for each individual instance of the game or for each geographic location. The score server 110 communicates the list 130 to a device 103 when the device 103 requests the list 130. The player 102 then uses the personal device 103 to view the list 130. The player 102 may control which view of the list 130 the player 102 desires to see. For example, the player 102 may view a ranked list of the top scores 112 across all instances of the game. As another example, the player 102 may view the top scores 112 for the particular instance of the game that the player 102 played. In some embodiments, the score server 110 also communicates the list 130 to the game machines 104. The game machines 104 may display the list 130 on a display visible to players 102. For example, the list 130 may be displayed to the players 102 during or after the game as a leader board so the players 102 can see the current top scores.

In certain embodiments, the player 102 designates de-anonymizing rules to be communicated along with the player identifier 128. The de-anonymizing rules may specify the manner in which the player identifier 128 (and personal information generally) is used. For example, the rules may specify that the player identifier 128 is visible only to other team members, or members of a school or religious group, or only with other players of a specified age. The de-anonymizing rules may also specify a time frame (e.g., the personal information can be used only today) or geographic restrictions (e.g., the personal information can be used at a specific location, but not affiliated locations). In this manner, the player 102 may have complete control over whether and how to opt-in with additional information to de-anonymize the performance information. The score server 110 observes the player's 102 de-anonymizing rules when generating the list of top scores 112. For example, if the de-anonymizing rules specify that the player identifier 128 may only be presented to the player's 102 team or party, then the score server 110 does not include the player identifier 128 in the list of top scores 112 when generating the list of top scores 112 for a person who is not in the player's 102 team or party. As another example, if the de-anonymizing rules specify that the player identifier 128 may only be presented for one day, then the score server 110 stops including the player identifier 128 in the list of top scores 112 after one day, even if the player's 102 score is still in the list of top scores 112. As a result, when the list of top scores 112 is presented on a public display visible to the players 102, the player identifier 128 may be displayed along with the list for one day and then removed the next day.

In some embodiments, the score server 110 communicates an alert 132 to the device 103 to notify the player 102 of an event related to the player's 102 score 112. For example, the score server 110 may communicate an alert 132 to the player 102 if the score 112 of the player 102 falls off the list 130 of top scores for the game. As another example, the score server 110 may communicate an alert 132 to the player 102 when the ranking of the score 112 of the player 102 in the list 130 changes. In this manner, the player 102 may be motivated to return to play the game to achieve a new top score 112.

In particular embodiments, the score server 110 communicates a picture 134 to the device 103 of the player 102. The picture 134 may be of the player 102 playing the game. The picture 134 may help the player 102 recollect the player's 102 experience in the game and may motivate the player 102 to return to play the game. In some embodiments, the score server 110 superimposes information onto the picture 134. For example, the score server 110 may superimpose the score 112 of the player 102 onto the picture 134. As another example, the score server 110 may superimpose the list 130 onto the picture 134.

Figure 2:
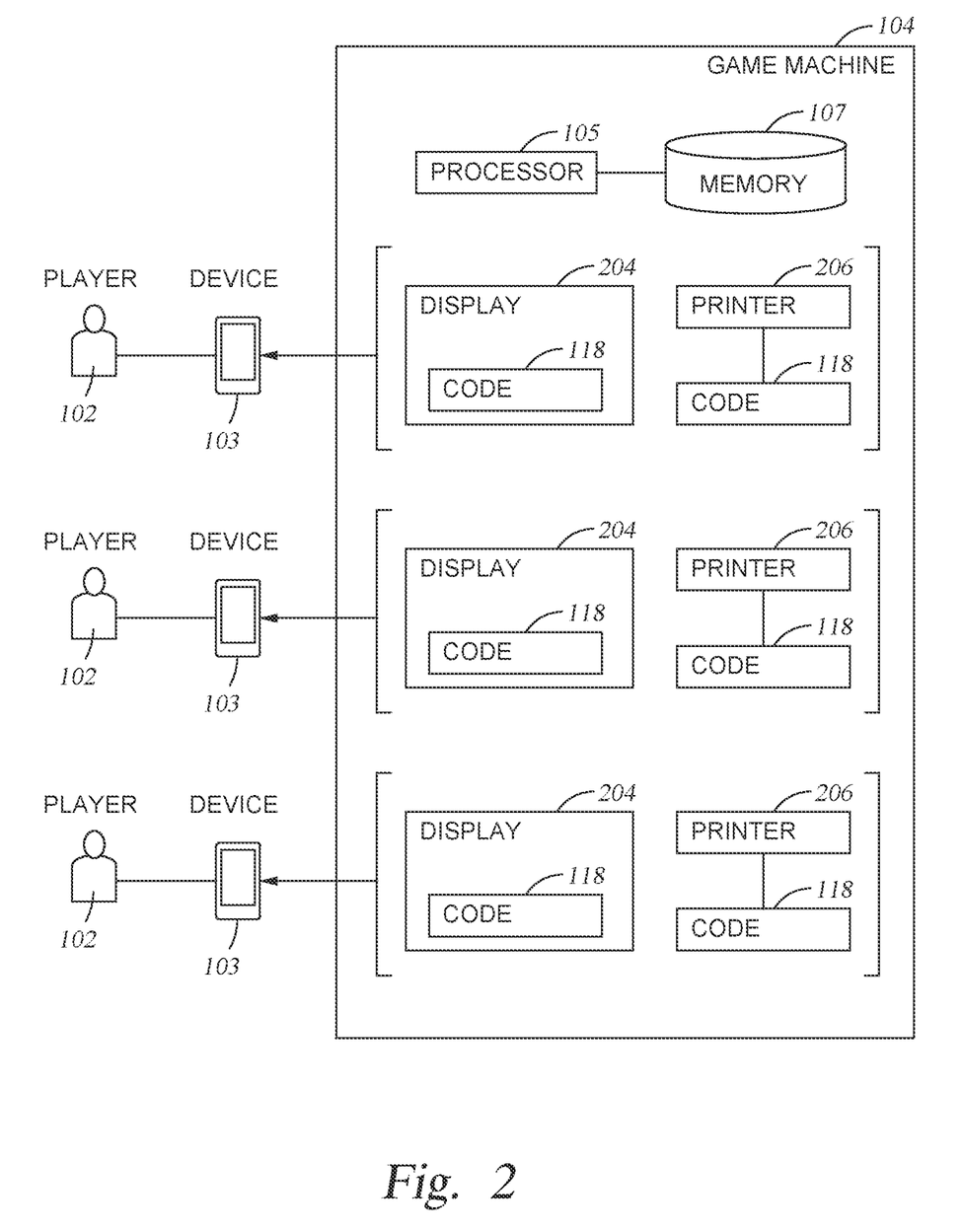
FIG. 2 illustrates example players and codes in the system of FIGS. 1A and 1B.

FIG. 2 illustrates example players 102 and codes 118 in the system 100 of FIGS. 1A and 1B. As seen in FIG. 2, the players 102 use personal devices 103 to receive codes 118 from the game machine 104. As discussed previously, the codes 118 may encode or include the session identifiers 114 and position identifiers 116 for the players 102. In particular embodiments, by providing the players 102 the codes 118, the players 102 may view their scores 112 in private, which also reduces congestion and improves social distancing in particular embodiments. Additionally, the players 102 are given the option to de-anonymize or re-anonymize their scores 112, which protects the privacy of the player's 102 identity or player identifier 128.

The game machine 104 includes a processor 105 and a memory 107, which are configured to perform any of the actions or functions of the game machine 104 described herein. For example, the game machine 104 may be an arcade game that includes the processor 105 and the memory 107. As another example, the game machine 104 may be an attraction vehicle or attraction wayside system that includes the processor 105 and the memory 107. The processor 105 executes instructions stored on the memory 210 to implement the various mechanisms of a game (e.g., special effects and timers). Additionally, the processor 105 may execute these instructions to detect when scoring events occur in the game, to apply game rules to determine a number of points to reward to a player 102 who caused or performed the scoring event, and to increment a score 112 for the player 102 by the determined number of points. Furthermore, the processor 105 may execute these instructions to generate the code 118 for the player 102.

Each player 102 may use a personal device 103 to scan or remember the code 118 provided to the player 102. The player 102 may use the device 103 to take a picture of the code 118 when the code 118 is provided to the player 102. The player 102 may subsequently use the device 103 to decode the code 118 in the picture. For example, if the code 118 is a linear barcode or a QR code, the device 103 may use a scanning feature or a scanning application to decode the code 118 in the picture. As another example, if the code 118 is a URL or a textual string, the device 103 may use a text recognition feature of application to copy the URL to a browser or to extract certain text (e.g., a session identifier 114 and/or a position identifier 116) from the text string.

The game machine 104 may include a display 204 visible to the player 102. The display 204 may display the code 118 to the player 102 so that the player 102 may use the device 103 to scan the code 118 or to take a picture of the code 118. As another example, the game machine 104 may include a printer 206 near the player 102. The printer 206 may print the code 118 on paper that the player 102 can take. The player 102 may then use the device 202 to scan or photograph the code 118 on the piece of paper. In this manner, the game machine 104 provides the code 118 to the player 102, which may occur before the player 102 leaves the game.

Each player 102, or team of players 102 if that is the nature of the game, is provided access to a display 204 or printer 206 for generating a code 118 for that player 102 or team of players 102. In this manner, the players 102 need not share a display 204 or a printer 206 to view the code 118 for the player 102. As a result of providing each player 102 access to their own display 204 and/or printer 206, the game machine 104 improves the privacy of the code 118 and the player 102 and helps to ensure that the code intended for a particular player 102 is provided to that particular player 102.

Figure 3:
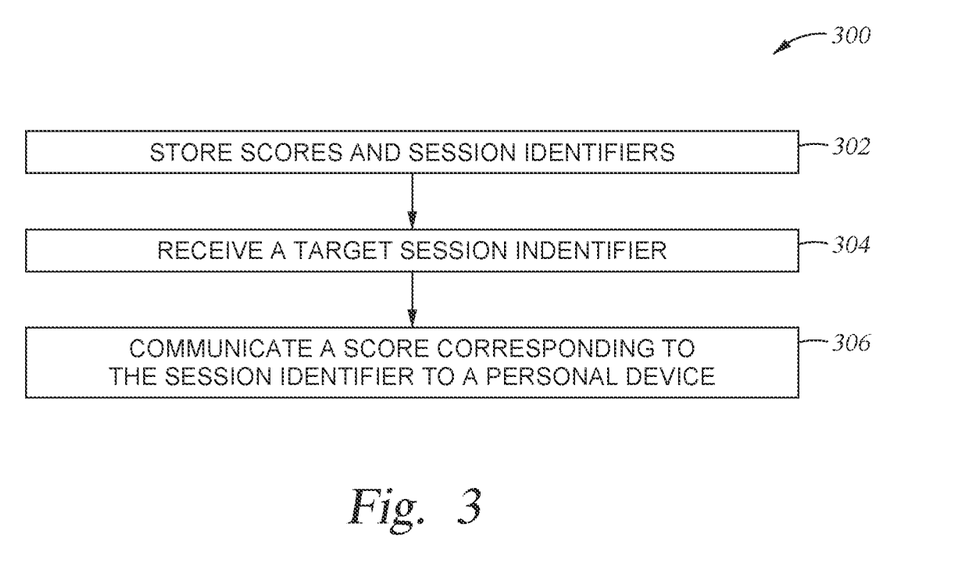
FIG. 3 is a flowchart of an example method in the system of FIGS. 1A and 1B.

FIG. 3 is a flowchart of an example method 300 in the system 100 of FIGS. 1A and 1B. The score server 110 performs the method 300. In 302, the score server 110 stores scores 112 and session identifiers 114 in a database 108. Different game machines 104 may have provided the scores 112 and the session identifiers 114 to the score server 110. The game machines 104 recorded the scores 112 by monitoring player activity during game sessions identified by the session identifiers 114 to determine when scoring events occur, by applying game rules to determine a number of points to be awarded for each scoring event, and incrementing the scores 112 of the players 102 who caused the scoring events to occur by the determined number of points. The score server 110 links each score 112 to a session identifier 114 by storing the scores 112 in a data structure in the database 108 using the corresponding session identifier 114 as an index.

In 304, the score server 110 receives a target session identifier 124 generated by a device 103 of a player 102. In some embodiments, the score server 110 communicates the target session identifier 124 in a suitably formatted query to the database 108. The database 108 then returns a score 112 that is linked to a session identifier 114 that matches the target session identifier 120. In some embodiments, the score server 110 also communicates a target position identifier 126 to the database 108. The database 108 returns a score 112 linked to a session identifier 114 and position identifier 116 that match the target session identifier 124 and the target position identifier 126.

In 306, the score server 110 communicates the score 112 from the database 108 to the personal device 202 of the player 102. The score 112 is linked to the session identifier 114 or the position identifier 116 that match the target session identifier 120 or the target position identifier 122. The player 102 may then view the score 112 on the personal device 202, which improves the privacy of the player 102. Additionally, because the player 102 views the score 112 on the personal device 202, the player 102 need not crowd with other players 102 around a central or public screen to view the score 112, which reduces congestion and improves social distancing in particular embodiments.

Figure 4:
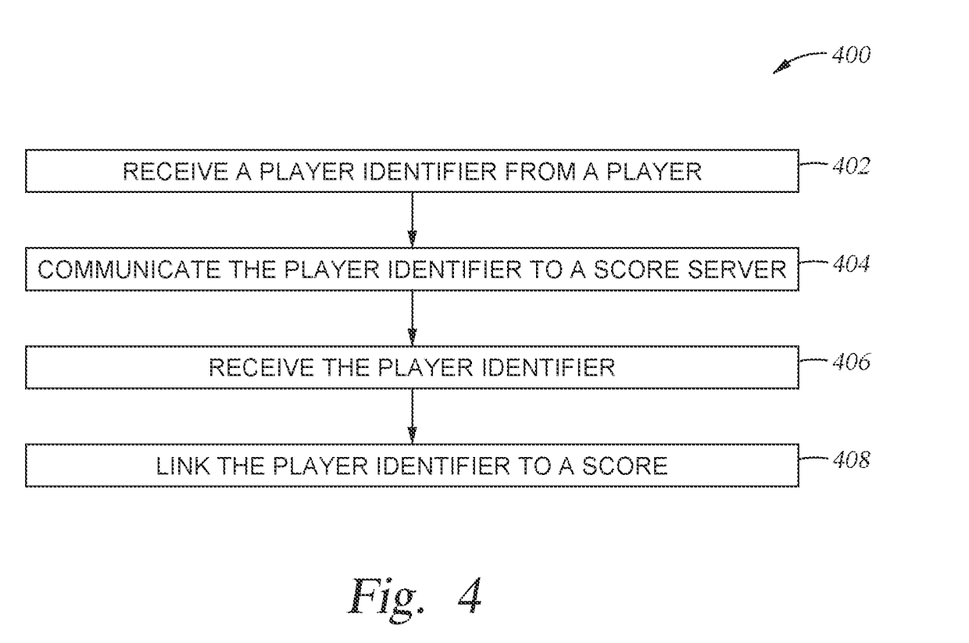
FIG. 4 is a flowchart of an example method in the system of FIGS. 1A and 1B.

FIG. 4 is a flowchart of an example method 400 in the system 100 of FIGS. 1A and 1B. A device 103 and the score server 110 perform the method 400. In particular embodiments, by performing the method 400, a player 102 is given control over the anonymity of a score 112.

In 402, the device 103 receives a player identifier 128 from a player 102. For example, the player 102 may have typed a name or handle on the device 103. As another example, the player 102 may have selected an avatar or image using the device 103. The player 102 may have provided the player identifier 128 intending to link the player identifier 128 to a score 112 of the player 102. In some embodiments, the player 102 also provides an instruction that indicates how the player identifier 128 may or may not be used. For example, the player 102 may select options on the device 103 that limit the people (e.g., family, friends, other players 102 in the same game session, etc.) to whom the player identifier 128 may be revealed. As another example, the player 102 may set a time (e.g., one hour, one day, etc.) when the player identifier 128 is to be automatically unlinked from the score 112 of the player 102.

In 404, the device 103 communicates the player identifier 128 to the score server 110. For example, the device 103 may transmit the player identifier 128 to the score server 110 over a WiFi network or a cellular network. In some embodiments, the device 103 also communicates to the score server

110 the instruction that indicates how the player identifier 128 may or may not be used.

In 406, the score server 110 receives the player identifier 128 from the device 103. In 408, the score server 110 links the player identifier 128 to the score 112. For example, the score server 110 may store the player identifier 128 with the score 112 in the data base 108 such that the player identifier 128 is indexed using the same session identifier 114 and/or position identifier 116 as the score 112. As another example, the score server 110 may store the player identifier 128 in a separate data structure in the database 108 using as indexes the same session identifier 114 and/or position identifier 116 that index the score 112. The player identifier 128 may be used to associate the score 112 with an identity of the player 102 when the player 102 has supplied their player identifier 128 and permitted its use in this manner (e.g., by supplying the instruction that indicates how the player identifier 128 may or may not be used). For example, the score server 110 may present the score 112 along with the player identifier 128 in a list 130 of top scores. In this manner, other players 102 may view the score 112 and see the player identifier 128 of the player 102 who earned that score 112. As another example, the score server 110 may present the player identifier 128 along with the score 112 superimposed upon a picture 134 of the player 102 playing the game.

Figure 5:
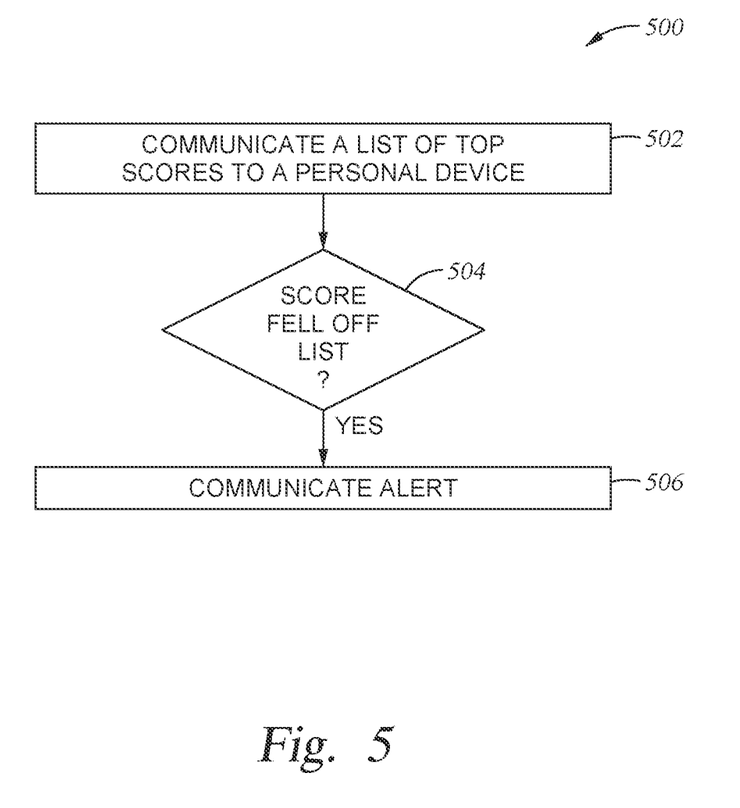
FIG. 5 is a flowchart of an example method in the system of FIGS. 1A and 1B.

FIG. 5 is a flowchart of an example method 500 in the system 100 of FIGS. 1A and 1B. The score server 110 performs the method 500. In particular embodiments, by performing the method 500, the score server 110 allows players 102 to view the scores of other players 102 without crowding around a central or public display screen, which reduces congestion and improves social distancing.

In 502, the score server 110 communicates a list 130 of top scores to a personal device 103 of a player 102. The list 130 includes the top scores earned while playing a game and may also be displayed publicly on a leader board if so permitted by the players 102 who earned those top scores. The list 130 may be segmented based on different instances of the game across different geographic locations or other demographic information that a player 102 has chosen to associate with their session identifier 114. For example, a player 102 may choose to view the top scores earned across all instances of a game or the top scores earned at a particular instance of the game at a particular geographic location.

In 504, the score server 110 determines whether a particular score 112 fell off the list 130. For example, the score server 110 may determine whether a score 112 of a particular player 102 fell off the list 130. If the score 112 did not fall off the list 130, the score server 110 may conclude the method 500. If the score 112 fell off the list 130, and the player 102 has associated, via player identifier 128, contact information and appropriate permissions with their session identifier 114, the score server 110 communicates an alert 132 to the personal device 103 of the player 102 in 506. The alert 132 may notify the player 102 that the score 112 earned by that player 102 when playing the game is no longer on the list 130. The alert 132 may motivate the player 102 to return to the game to play again to earn another top score.

Figure 6:
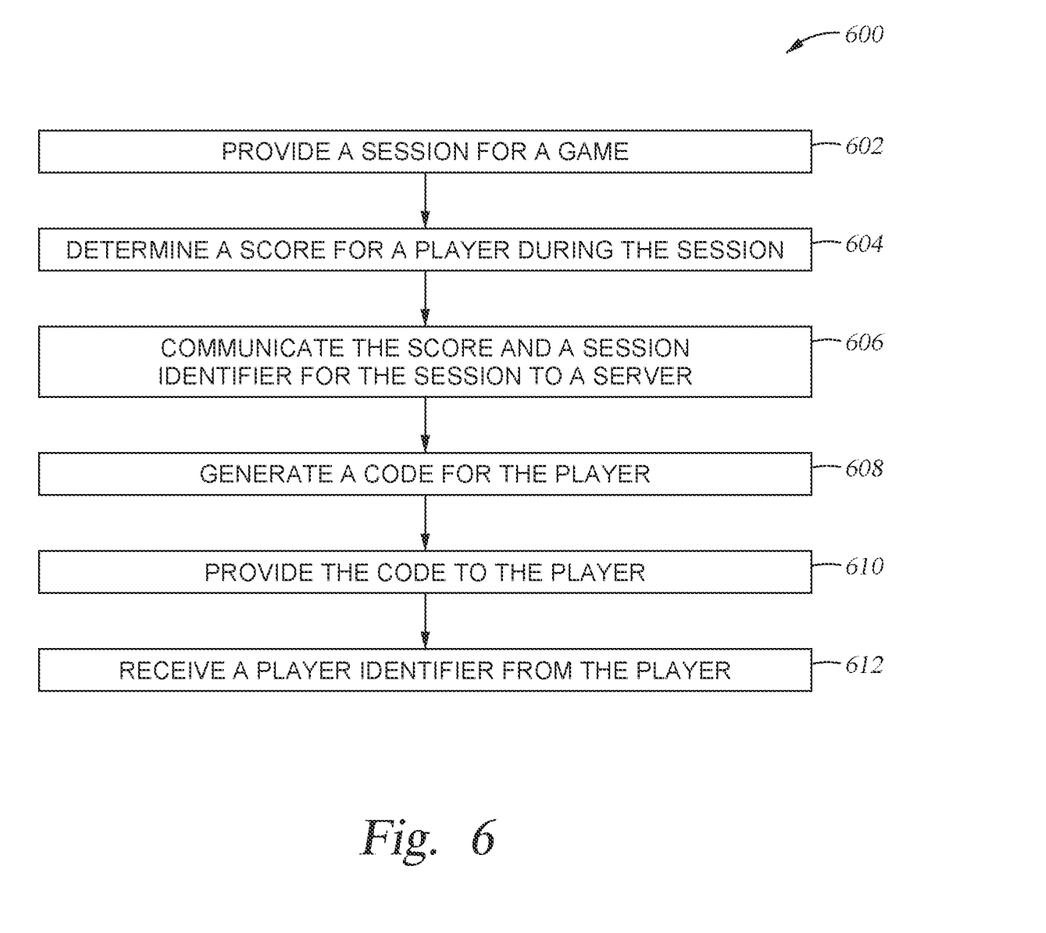
FIG. 6 is a flowchart of an example method in the system of FIGS. 1A and 1B.

FIG. 6 is a flowchart of an example method 600 in the system 100 of FIGS. 1A and 1B. A device 103 and a game machine 104 in the system 100 perform the method 600. In particular embodiments, by performing the method 600, the game machine 104 protects the privacy of a player 102 when viewing a score 112. Additionally, the privacy of the player 102 is further protected by giving the player 102 control over the anonymity of the score 112.

In 602, the game machine 104 provides a session for a game. The session may be a particular instance of game play, sporting activity, or the like characterized by one or more players 102 that occurs at a particular time or span of time, and may occur at a specific physical or virtual space. The session is identified with the session identifier 114. One or more players 102 may play the game during the session. In 604, the game machine 104 determines a score 112 or other performance metric for a player 102 during the session. The player 102 may have earned the score 112 by completing certain tasks or performing certain actions during the game. The game machine 104 includes sensor and monitoring hardware to detect and measure actions, events, and game state. The game machine 104 implements game rules and logic to determine when these actions, events, and state information affect a score 112 or other performance metric. When a score 112 is affected, for example, the game machine 104 quantifies, according to the game rules it is implementing, how particular actions, events, and state changes affect the score 112 and change the score 112 accordingly. Similarly, any number of performance metrics such as lap time, longest shot, longest winning streak and the like can be measured and quantified for the game session while the player 102 remains anonymous.

In 606, the game machine 104 communicates the score 112 and/or performance metrics along with the session identifier 114 for the session to a score server 110. In certain embodiments, the game machine 104 also communicates the position identifier 116 for the player 102 to the score server 110. The score server 110 links the score 112 and/or performance metrics with the session identifier 114 and/or the position identifier 116 by, for example, storing the score 112 and/or performance metrics in memory or database 108 in a record (e.g., a table) that is indexed by the session identifier 114 and position identifier 116. The session identifier 114 or the position identifier 116 may uniquely link the score 112 to that player 102 such that the player's score 112 may be retrieved using the session identifier 114 and position identifier 116. For example, the session identifier 114 may identify the session of the game in which the player 102 played. The position identifier 116 may identify a physical position of the player 102 during the session of the game.

In 608, the game machine 104 generates a code 118 for the player 102. The code 118 may be any suitable code that encodes or points to the session identifier 114 and, if used, the position identifier 116 for that player 102. For example, the game machine 104 may execute software that takes as input one or more of the session identifier 114, the position identifier 116, and the score 112 and that encodes that input into a graphical code (e.g., a linear bar code or a QR code) or an alphanumeric code (e.g., a URL or a text string). The game machine 104 may provide the code 118 to the player 102 in 610. For example, the game machine 104 may include a display 204 that displays the code 118 to the player 102 before the player 102 leaves the game. As another example, the game machine 104 may include a printer 206 that prints the code 118 onto a sheet of paper for the player 102 to take before the player 102 leaves the game. As yet another example, the game machine 104 may include a speaker that presents the code 118 audibly to the player 102. As yet another example, the game machine 104 may include a radio or antenna (e.g., a Bluetooth radio or a near field communications radio) that wirelessly transmits the code 118 to a device 103 of the player 102.

In 612, the device 103 of the player 102 receives a player identifier 128 from the player 102. For example, the player 102 may input a name or a handle on the device 103. As another example, the player 102 may select an avatar or an image on the device 103. The player 102 may provide the player identifier 128 as a way to identify the player 102. The player 102 may later instruct the device 103 to communicate the player identifier 128 to the score server 110 to de-anonymize the score 112 of the player 102 so that other people can view the player identifier 128 along with the score 112. In this manner, the player 102 is given control over the anonymity of the score 112 and the privacy of the player identifier 128.

In summary, the system 100 records the scores 112 of players 102 across game sessions. Each player 102 is provided a unique code 118 that is linked to that player's 102 game session before the player 102 leaves the game. The player 102 may use a personal device 103 to decide the code 118 at a time of the player's 102 choosing. For example, the player 102 may take a picture of the code 118 and then decode the code 118 in the picture later when convenient or safe for the player 102 to do so. The code 118 may include a session identifier 114 for the player's game session. By decoding the code 118, the session identifier 114 is matched and the player's 102 score 112 is retrieved and communicated to the player's 102 personal device 103 for viewing. Additionally, the player 102 may review a list 130 of top scores using the personal device 103. In this manner, players 102 may view scores in private. Moreover, the players 102 need not stop to view a shared screen to see their scores 112, which reduces congestion and improves social distancing. The players 102 may also provide a player identifier 128 (e.g., a name, handle, avatar, or image) that may be linked to the score 112 along with instructions governing how the player identifier 128 may or may not be used. The player identifier 128 may then be linked with the score 112 and displayed alongside the score 112 (e.g., in the list 130), if permitted. In this manner, the player is given control over when and how to de-anonymize the score 112.

In the current disclosure, reference is made to various embodiments. However, it should be understood that the present disclosure is not limited to specific described embodiments. Instead, any combination of the disclosed features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++, Python, Ruby, Scala, PHP, or the like and conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    receiving, by a score server and from a game system, a plurality of scores and a plurality of session identifiers for a game, the plurality of scores generated by the game system (i) based on player activity monitored during game sessions identified by the plurality of session identifiers and ii by applying rules of the game to determine scoring events based on the player activity;
    causing, by the hardware processor of the score server, the plurality of scores and the plurality of session identifiers to be stored in a database;
    generating, by the hardware processor of the score server and during a game session, a code for a player;
    providing the code to the player before the player leaves the game;
    receiving, by the hardware processor of the score server and from a device of the player, a target session identifier generated by the device of the player based on the code;
    in response to receiving the target session identifier, retrieving, by the hardware processor of the score server and from the database, a score of the plurality of scores generated during a game session identified by a session identifier of the plurality of session identifiers that matches the target session identifier; and
    communicating, to the device of the player, the retrieved score.

2. The method of claim 1, further comprising:
    causing to be stored in the database a plurality of position identifiers indicating physical positions of players during the game sessions identified by the plurality of session identifiers; and
    receiving, by the hardware processor of the score server and from the device of the player, a target position identifier generated based on the code provided to the player before the player left the game, wherein the retrieved score is linked to a physical position indicated by a position identifier of the plurality of position identifiers that matches the target position identifier.

3. The method of claim 1, further comprising:
    receiving, by the hardware processor of the score server and from the device of the player, a player identifier; and
    linking, by the hardware processor of the score server, the player identifier to the retrieved score.

4. The method of claim 3, further comprising unlinking, by the hardware processor of the score server, the player identifier from the retrieved score in response to a received request to unlink the player identifier.

5. The method of claim 3, further comprising displaying a list of top scores, wherein at least one entry on the list of top scores includes information from the player identifier associated with the player that has permitted the information from the player identifier to be displayed.

6. The method of claim 5, wherein the player identifier is accompanied by a de-anonymizing rule specified by the player and wherein the de-anonymizing rule controls the display of the information from the player identifier.

7. The method of claim 1, wherein the player activity occurs in parallel in a same geographic location.

8. The method of claim 1, further comprising communicating, to the device, a list of top scores for the game, wherein the list of top scores is segmented based on physical instances of the game across different geographic locations.

9. The method of claim 8, further comprising communicating, to the device, an alert when the retrieved score is removed from the list of top scores.

10. The method of claim 1, wherein the target session identifier is received from the device of the player after the player left the game.

11. The method of claim 1, further comprising communicating, to the device, a picture of the player during the game.

12. The method of claim 1, wherein the code does not include the score,
    wherein the code is provided to the device via the player after the player leaves the game, wherein the code uniquely identifies the player relative to other players;
    wherein each game session includes a plurality of players including the player, wherein the game constitutes an attraction at an amusement park;
    wherein multiple scores are tracked for the player for multiple game sessions by the player, wherein the multiple scores are tied to the same player.

13. An apparatus comprising:
    a memory; and
    a hardware processor communicatively coupled to the memory, the hardware processor configured to:
        receive, by a score server and from a game system, a plurality of scores and a plurality of session identifiers for a game, the plurality of scores generated by the came system (i) based on player activity monitored during game sessions identified by the plurality of session identifiers and (ii) by applying rules of the game to determine scoring events based on the player activity;
        cause the plurality of scores and the plurality of session identifiers to be stored in a database;
        generate, during a game session, a code for a player;
        provide the code to the player before the player leaves the game;
        receive, from a device of the player, a target session identifier generated by the device of the player based on the code;
        in response to receiving the target session identifier, retrieve, from the database, a score of the plurality of scores generated during a game session identified by a session identifier of the plurality of session identifiers that matches the target session identifier; and
        communicate, to the device of the player, the retrieved score.

14. The apparatus of claim 13, the hardware processor further configured to:
   cause to be stored in the database a plurality of position identifiers indicating physical positions of players during the game sessions identified by the plurality of session identifiers; and
   receive, from the device of the player, a target position identifier generated based on the code provided to the player before the player left the game, wherein the retrieved score is linked to a physical position indicated by a position identifier of the plurality of position identifiers that matches the target position identifier.

15. The apparatus of claim 13, the hardware processor further configured to:
   receiving, from the device of the player, a player identifier; and
   link the player identifier to the retrieved score.

16. The apparatus of claim 15, the hardware processor further configured to display a list of top scores, wherein at least one entry on the list of top scores includes information from the player identifier associated with the player that has permitted the information from the player identifier to be displayed.

17. The apparatus of claim 16, wherein the player identifier is accompanied by a de-anonymizing rule specified by the player and wherein the de-anonymizing rule controls the display of the information from the player identifier.

18. The apparatus of claim 13, the hardware processor further configured to communicate, to the device of the player, a list of top scores for the game, wherein the list of top scores is segmented based on physical instances of the game across different geographic locations.

19. The apparatus of claim 13, wherein the player activity occurs in parallel in a same geographic location.

20. The apparatus of claim 13, wherein the target session identifier is received from the device of the player after the player left the game.

21. A method comprising:
   generating, by a hardware processor of a game system, a score for a player (i) based on monitored activity of a player during a session of a game and (ii) by applying rules of the game to the activity to determine scoring events;
   communicating, by the game system to the server, the score and a session identifier for the session, wherein the server is configured to cause the score and the session identifier to be stored in a database; and
   displaying a quick response (QR) code to the player before the player leaves the game, wherein the QR code is scannable, via a device of the player, to obtain the session identifier, wherein the session identifier is communicable from the device to the server to receive, on the device and from the server, the score based on matching, on the server, the session identifier with a target session identifier.

\* \* \* \* \*

UNITED STATES PATENT AND TRADEMARK OFFICE
CERTIFICATE OF CORRECTION

| | | |
|---|---|---|
| PATENT NO. | : 11,602,695 B2 | |
| APPLICATION NO. | : 17/239788 | |
| DATED | : March 14, 2023 | |
| INVENTOR(S) | : Jeffrey L. Elbert et al. | |

It is certified that error appears in the above-identified patent and that said Letters Patent is hereby corrected as shown below:

In the Claims

In Column 19, Line 28, in Claim 1, delete "ii" and insert -- (ii) --.

In Column 20, Line 48, in Claim 13, delete "came" and insert -- game --.

Signed and Sealed this
Nineteenth Day of September, 2023

Katherine Kelly Vidal
*Director of the United States Patent and Trademark Office*